(12) United States Patent
Liao (10) Patent No.: US 6,937,725 B2
(45) Date of Patent: *Aug. 30, 2005

(54) SHORT WIRE LENGTH WIRE-WINDING BOX

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 415 days.

This patent is subject to a terminal disclaimer.

(21) Appl. No.: 10/194,063

(22) Filed: Jul. 15, 2002

(65) Prior Publication Data

US 2003/0106823 A1 Jun. 12, 2003

(30) Foreign Application Priority Data

Dec. 7, 2001 (DE) ..................................... 201 19 860 U (51) Int. Cl.[7] .............................................. H04M 1/00
(52) U.S. Cl. ..................................... 379/438; 379/430
(58) Field of Search ................................ 379/438, 430; 242/373, 378.1; 342/378.2; 191/12.2 R, 12.4

(56) References Cited

U.S. PATENT DOCUMENTS

| | | | | | |
|---|---|---|---|---|---|
| 2,976,374 A | * | 3/1961 | Poulsen | ..................... | 191/12.4 |
| 3,056,863 A | * | 10/1962 | Johnson | ..................... | 191/12.4 |
| 4,384,688 A | * | 5/1983 | Smith | ..................... | 242/378.2 |
| 4,499,341 A | * | 2/1985 | Boyd | ..................... | 191/12.4 |
| 4,713,497 A | * | 12/1987 | Smith | ..................... | 191/12.2 R |
| 4,940,859 A | * | 7/1990 | Peterson | ..................... | 191/12.4 |
| 6,135,254 A | * | 10/2000 | Liao | ..................... | 191/12.4 |
| 6,502,777 B2 | * | 1/2003 | Liao | ..................... | 242/373 |
| 6,616,080 B1 | * | 9/2003 | Edwards et al. | ..................... | 242/378.1 |

* cited by examiner

Primary Examiner—Jack Chiang
(74) Attorney, Agent, or Firm—Browdy and Neimark, P.L.L.C.

(57) ABSTRACT

An improved short wire length wire-winding box includes a rotary disk driven by a spiral reed and pivotally installed in a casing having a receiving groove. The communication wire is at first wound around a pivotal shaft (inner circle) for several turns, and then is placed in the rotary disk. The rotary disk is rotated so that the communication wire is wound around a second ring (outer circle) in the same direction. When the communication wire is directly pulled out from the wire-winding box, the communication wire wound around the pivotal shaft will be pulled more and more tightly so that the communication wire wound around the pivotal shaft will not disperse for avoiding the situation that part of the communication wire can not be rewound. Moreover, the communication wire wound around the pivotal shaft can be tightly positioned thereon without any positioning device.

7 Claims, 14 Drawing Sheets

SHORT WIRE LENGTH WIRE-WINDING BOX

FIELD OF THE INVENTION

The present invention relates to an improved short wire length wire-winding box and, more particularly, to an improved short wire length wire-winding box applicable to short-distance wired communication apparatuses, whereby a communication wire of required length can be pulled out freely and can also be automatically rewound timely.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external wire or inconvenience of use due to a too-short length of external wire, several kinds of wire-winding boxes applicable to various kinds of communications apparatuses have been proposed. A general conventional wire-winding box comprises a casing, a rotary disk, a spiral reed, and a communication wire. The spiral reed and the rotary disk are fixedly joined to let the communication wire wound on the rotary disk have resilient restoring capability. Because electric connection needs to be kept on the communication wire during the process of rotation when the communication wire is pulled out or wound back, part of wire-winding boxes will be installed with conductive devices of different structures. For instance, electric connection on the communication wire will not be affected when the rotary disk rotates by installing a plurality of concentric conductive rings of different radii on the disk face of the rotary disk and a plurality of conductive elements like conductive resilient leaves or steel balls corresponding to the conductive rings on another rotary disk or the casing. However, because there are so many components of these conductive rings and conductive resilient leaves or steel balls, and each component has a very small volume, the assembly is time-consuming and difficult. Moreover, bad contact or other failures may easily arise in use.

Besides, a communication wire may show a tight state due to resiliency of the spiral reed when pulled out from a conventional wire-winding box so that a proper length of the communication wire cannot be kept outside, resulting in much trouble in use. To resolve this problem, in some wire-winding boxes, a swing piece capable of resiliently swinging is utilized, and gaps and buckling grooves disposed at the periphery of a rotary disk are matched, thereby accomplishing winding or positioning function.

Figure 1:
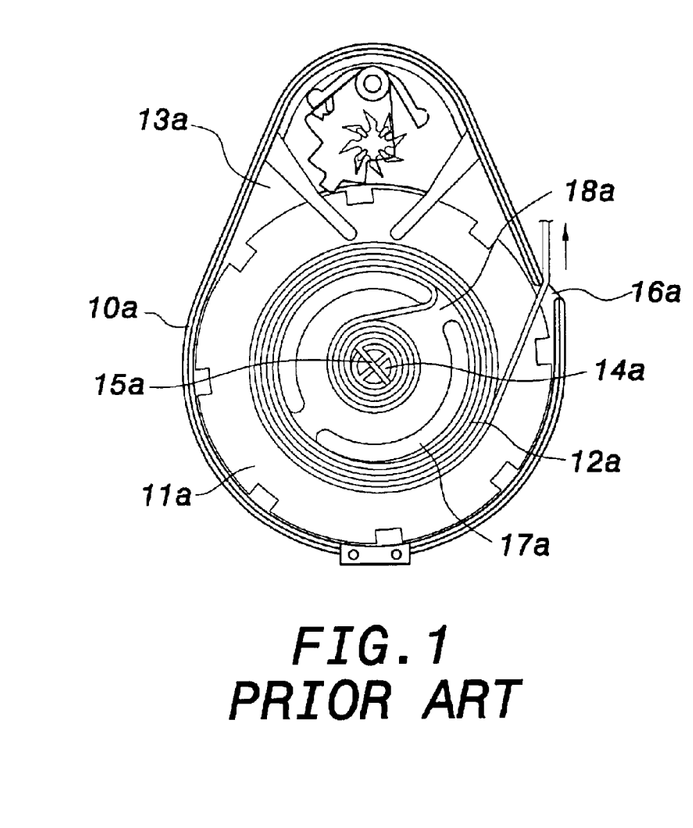
FIG. 1 is a plan view of a rotary disk of a prior art wire-winding box, wherein a communication wire is pulled out.
Figure 2:
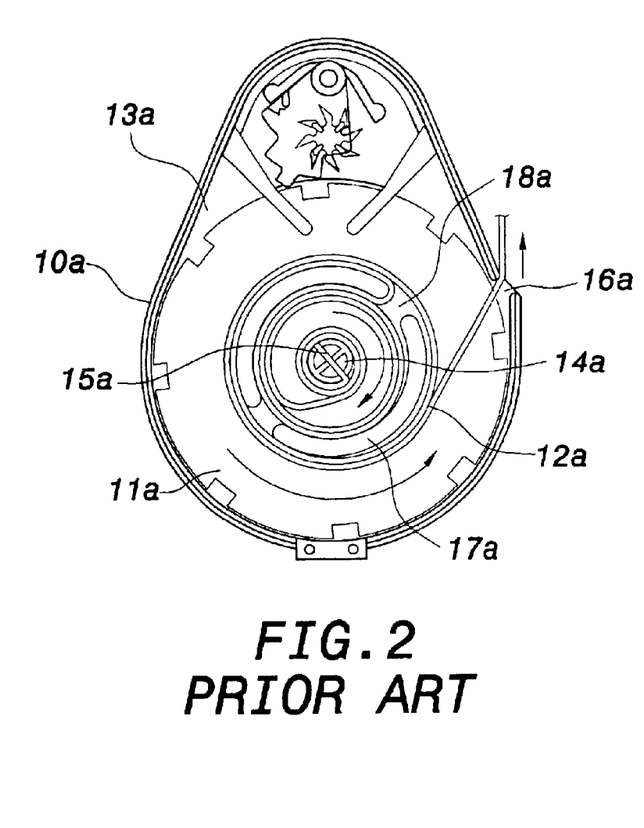
FIG. 2 is a plan view of a rotary disk of a prior art wire-winding box, wherein another communication wire is pulled out.

As shown in FIGS. 1 and 2, a prior art short wire length wire-winding box is illustrated. This prior art wire-winding box includes a casing 10a, a rotary disk 11a, a communication wire 12a and a spiral reed (not shown). The casing 10a having a receiving groove 13a therein. The receiving groove 13a is installed with a pivotal shaft 14a. The lateral sides of the pivotal shaft 14a and the casing 10a are installed with wire outlets 15a and 16a. The rotary disk 11a is received in the receiving groove 13a and is pivotally engaged to the pivotal shaft 14a for rotation. One lateral side thereof is installed with a ring 17a. The ring 17a is installed with a slot 18a. One wire end of the communication wire 12a passes through the wire outlet 15a of the pivotal shaft, while other part of the communication wire 12a is firstly bent through a proper angle and then pulled to the slot 18a of the ring 17a. Subsequently, it protrudes out from the other wire outlet 16a of the casing 10a. When the rotary disk 11a rotates, the communication wire 12a may slide on the ring 17a timely so as to be wound around the pivotal shaft 14a and the ring 17a. The spiral reed (not shown) is used to provide restoring elasticity to the rotary disk 11a.

The above short wire length wire-winding box can greatly reduce the number of subassemblies, can facilitate assembly and mass production, and can let the communication wire be simultaneously wound around the pivotal shaft and the ring in special interactive way when the rotary disk rotates. Thereby, it is not necessary to install complicated and delicate conductive subassemblies in the wire-winding box so as to simplify assembly.

However, since as the communication wire 12a is pulled out directly from the wire-winding box, the communication wire 12a wound on the pivotal shaft 14a (inner circle) will become looser and looser by a further pulling force, i.e., the communication wire 12a on the pivotal shaft 14a will disperse (referring to FIG. 2) so that part of the communication wire 12a on the inner circle is difficult to be received. Therefore, other positioning device (not shown) is necessary for positioning the communication wire 12a on the pivotal shaft 14a.

Furthermore, since as the communication wire 12a is wound back to the wire-winding box, the pivotal shaft 14a (inner circle) and the ring 17a (outer circle) are wound by the communication wire 12a. The inner and outer circles need spiral reeds and thus, the spiral reed needs a large elastic force. Moreover, a large friction force is formed between different parts of the communication wire, and thus different parts of the communication wire 12a will be hindered by one another.

SUMMARY OF THE INVENTION

Accordingly, the primary object of the present invention is to provide an improved short wire length wire-winding box, wherein a communication wire is wound around a pivotal shaft (inner circle) first and then around a second ring (outer circle) in the same direction. When the communication wire is directly pulled out from the wire-winding box, the communication wire wound around the pivotal shaft will be pulled more and more tightly so that it will not disperse, hence avoiding the situation that part of the communication wire cannot be wound back. Moreover, the communication wire wound around the pivotal shaft can be tightly positioned thereon without any positioning device.

Another object of the present invention is to provide an improved short wire length wire-winding box, whereby when the communication wire is wound back in the box, only the second ring winds the communication wire and thus, only the second ring needs to use the spiral reed. Therefore, the spiral reed needs only a small elastic force and thus the friction force to the communication wire can be effectively reduced. The situation that the communication wire is hindered by itself will not occur.

To achieve the above objects, the present invention provides an improved short wire length wire-winding box, which comprises a casing, a rotary disk, a communication wire, and a spiral reed. The casing has a receiving groove therein. The receiving groove is installed with a pivotal shaft. The lateral sides of the pivotal shaft and the casing are installed with wire outlets. The rotary disk is received in the receiving groove and is pivotally engaged to the pivotal shaft for rotation. One lateral side thereof is installed with a ring. The ring is installed with a slot. One wire end of the communication wire passes through the wire outlet of the pivotal shaft, and is wound around the pivotal shaft for several turns. The communication wire passing through the slot of the ring is wound around the ring in the same direction, and then protrudes out of the wire outlet of the casing. The spiral reed is disposed between the casing and the rotary disk to provide restoring elasticity to the rotary disk.

The various objects and advantages of the present invention will be more readily understood from the following detailed description when read in conjunction with the appended drawing.

DETAILED DESCRIPTION OF THE PREFERRED EMBODIMENTS

Figure 3:
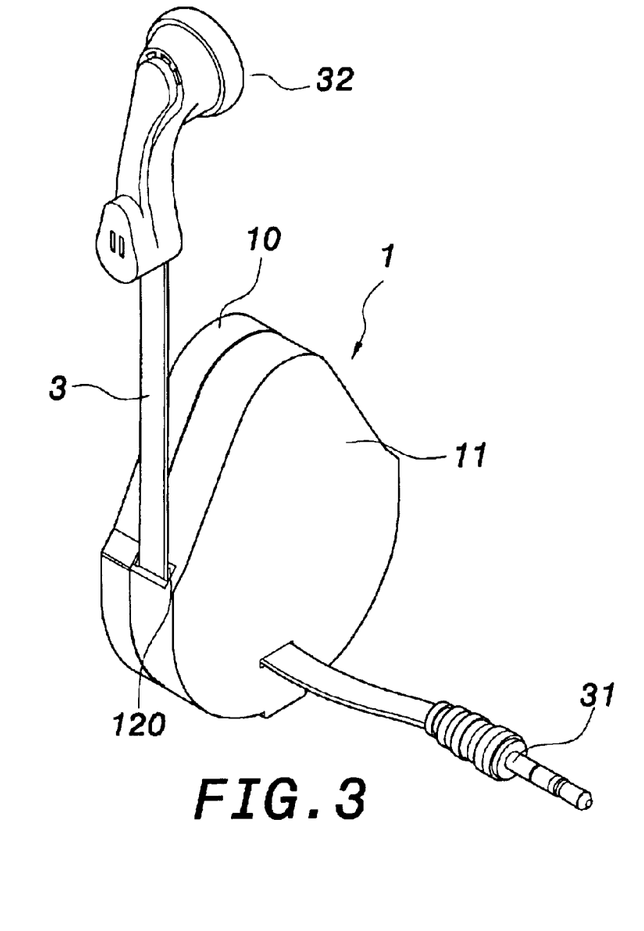
FIG. 3 is a perspective assembly view of the first embodiment of the present invention.
Figure 4:
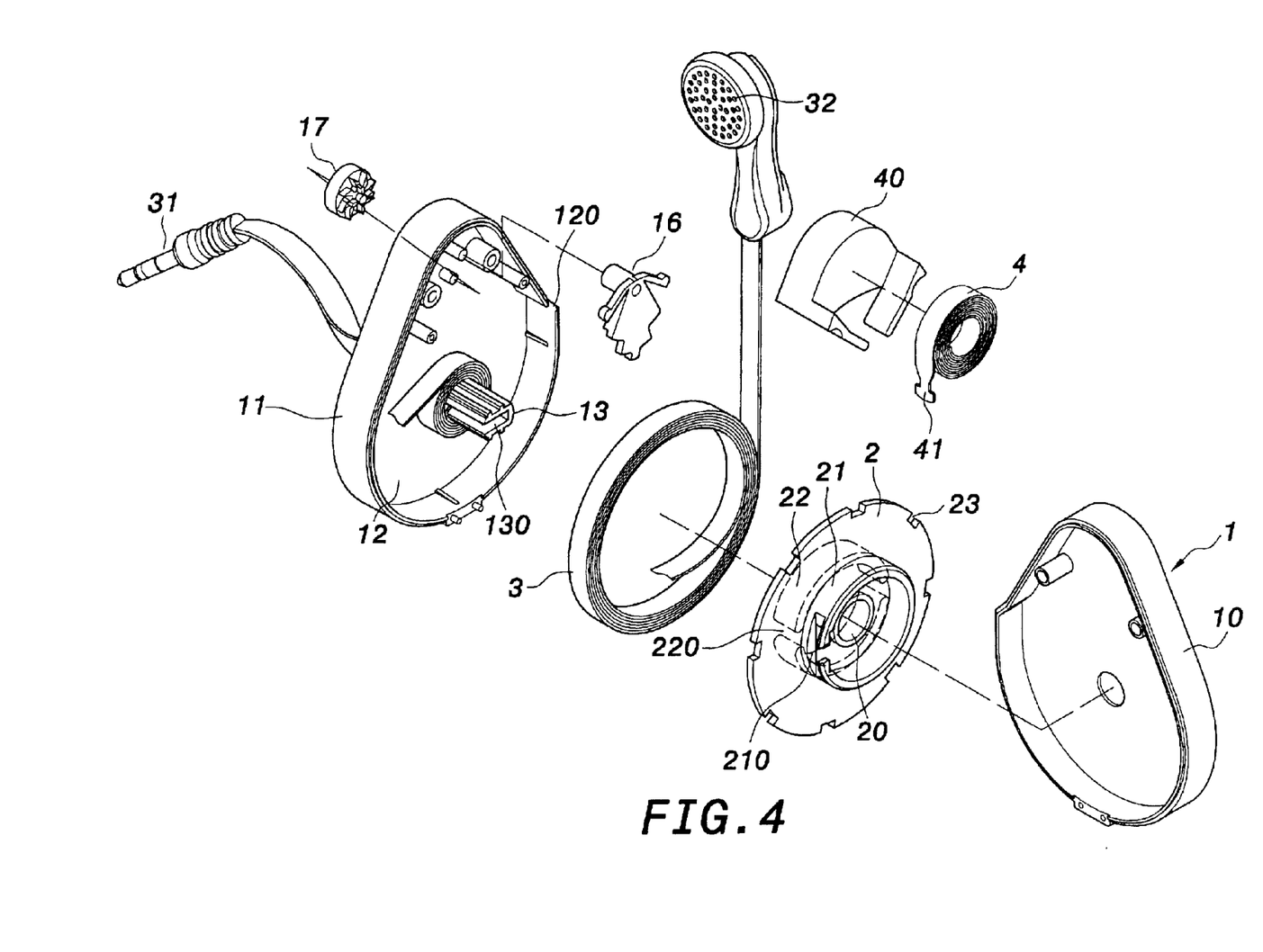
FIG. 4 is an exploded perspective view of the first embodiment of the present invention.

As shown FIGS. 3 and 4, an improved short wire length wire-winding box of the present invention is illustrated. The short wire length wire-winding box comprises a casing 1, a rotary disk 2, a communication wire 3 and a spiral reed 4.

The casing 1 is formed by assembling a first casing half 10 and a second casing half 11, with a receiving groove 12 formed therein. A pivotal shaft 13 is installed in the receiving groove 12. The lateral sides of the receiving groove 12 and the casing 1 are installed with wire outlets 130 and 120. The receiving groove 12 is further installed with the rotary disk 2. The rotary disk 2 has a pivotal hole 20 so that the pivotal shaft 13 is engaged therein for rotation. The two lateral sides are installed with a first ring 21 and a second ring 22. The first ring 21 is installed with a hook groove 210. Thereby, one hook end 41 of the spiral reed 4 on the bearing seat 40 at the outer side of the rotary disk 2 can be hooked thereto so that the spiral reed 4 is installed between the casing 1 and the rotary disk 2 so as to provide a restoring elasticity. The second ring 22 is installed with a slot 220.

Figure 5:
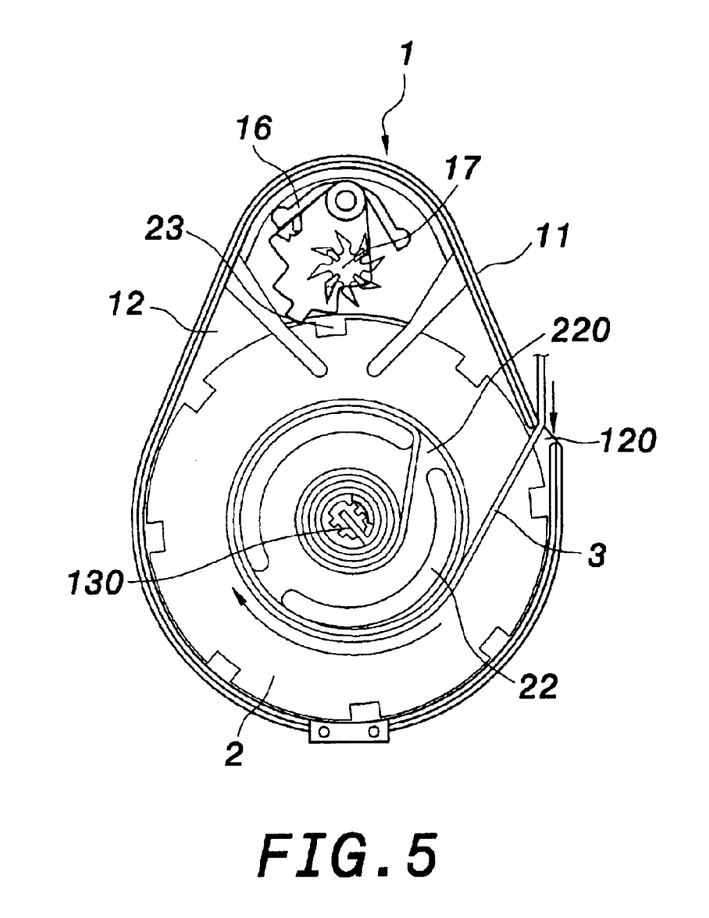
FIG. 5 is a plan view of a rotary disk of the wire-winding box according to the present invention, wherein a communication wire is assembled.
Figure 6:
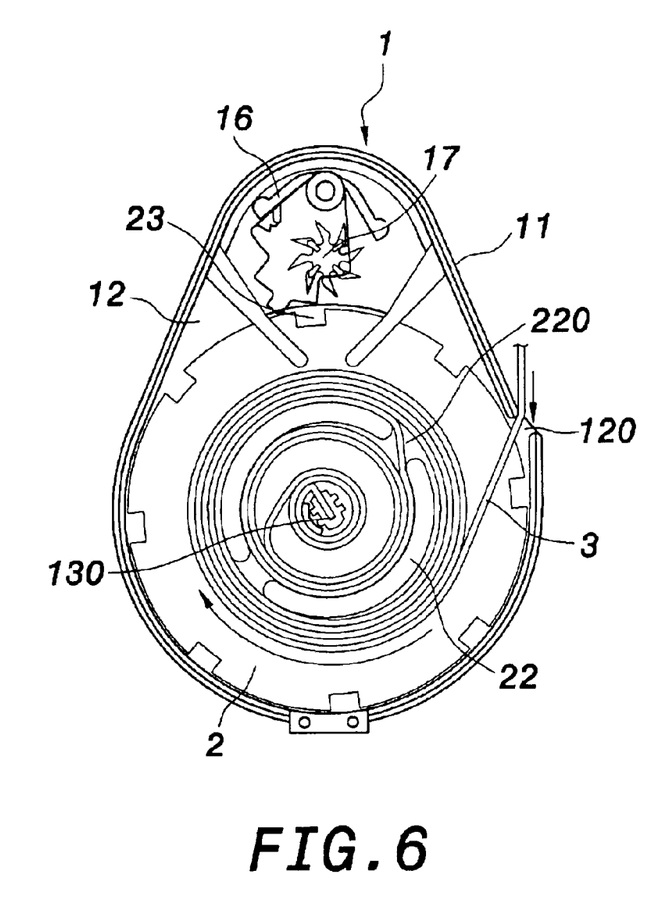
FIG. 6 is another plan view of a rotary disk of the wire-winding box according to the present invention, wherein a communication wire is assembled.

One end of the communication wire 3 passes through the wire outlet 130 of the pivotal shaft 13, and then winds around the pivotal shaft 13 for several turns. Then, it is placed in the rotary disk 2. Next, the rotary disk 2 is rotated so that the communication wire 3 passing through the slot 220 of the second ring 22 is wound on the second ring 22 in the same direction (referring to FIGS. 5 and 6), and then the wire protrudes out from the wire outlet 120 of the casing 1. Furthermore, the hook end 41 of the spiral reed 4 is hooked to the hook groove 210.

The two wire ends of the communication wire 3 may be assembled to various kinds of connection plugs or other devices according to the communication device used, e.g., an audio source plug 31, or a hand-free earphone 32 with an earphone and a microphone, as shown in FIG. 3.

Figure 7:
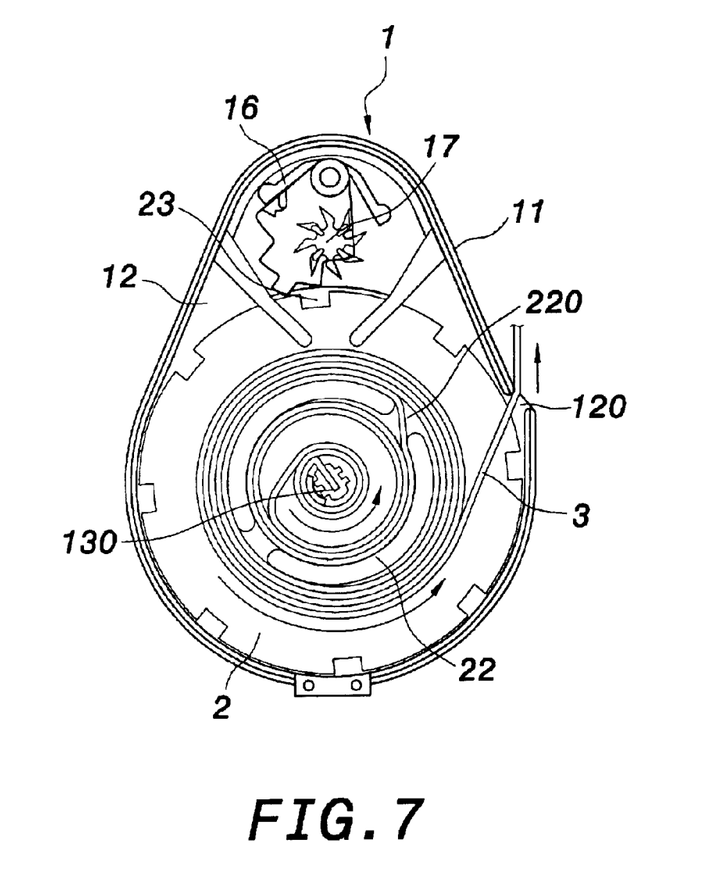
FIG. 7 is a plan view of a rotary disk of the wire-winding box according to the present invention, wherein a communication wire is pulled out.
Figure 8:
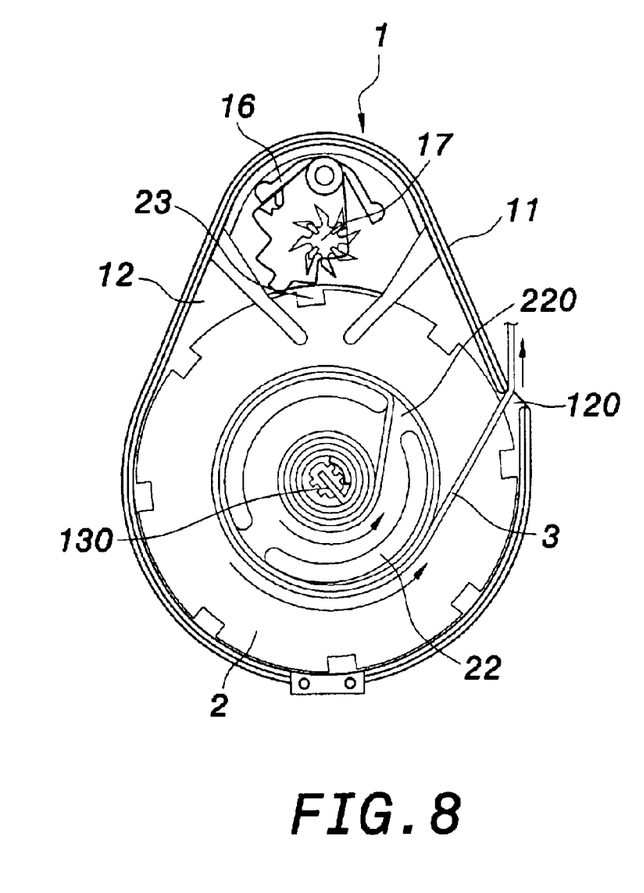
FIG. 8 is another plan view of a rotary disk of the wire-winding box according to the present invention, wherein a communication wire is pulled out.

Therefore, the communication wire 3 directly passes through the pivotal shaft 13 and then is pulled out and wound around the pivotal shaft 13. Then, it is wound around the second ring 22 in the same direction. When the communication wire 3 is rewound by the action of the spiral reed 4, the communication wire 3 will be wound around the second ring 22, and the communication wire 3 wound around the pivotal shaft 13 will expand outwards. As shown in FIGS. 7 and 8, when the communication wire 3 is pulled out so that the communication wire 3 at the outer circle is pulled away from the second ring 22 having a large diameter, because the communication wire 3 at the inner circle also rotates synchronously, the communication wire 3 will thus be wound around the pivotal shaft 13 having a smaller diameter.

Thereby, a wire-winding box illustrated in FIG. 3 is formed. In practical application, the wire-winding box can be used to receive a considerable length of the communication wire 3, and the communication wire 3 can be received at any time. A user may insert the plug 31 of the communication wire 3 to a relevant receptacle of a communication device for providing communication of information. The communication wire 3 can be pulled out directly from the wire-winding box, and a certain restoring tensile can be kept on the communication wire 3 through the action of the spiral reed 4 so that the communication wire 3 can be successfully rewound into the wire-winding box. The situation of exposed wire or entanglement of wire thus will not arise.

Besides, in order to prevent from being affected by winding tension as the communication wire 3 is pulled out for use, the periphery of the rotary disk is installed with a plurality of buckling grooves 23. A swing piece 16 capable of swinging freely and a ratchet capable of freely rotating are installed adjacent to the rotary disk 2. Through special reaction between the swing piece 16, the ratchet 17 and the buckling grooves 23, the communication wire 3 can be pulled or released repeatedly for fixing or rewinding.

In the present invention, the communication wire 3 is at first wound around the pivotal shaft 13 (inner circle), and then is placed in the rotary disk 2. Next, the communication wire 3 is wound around the second ring 22 (outer circle) in the same direction by rotating the rotary disk 2. When the rotary disk 2 is rotated, the inner circle will expand toward the outer circle, and therefore, the communication wire 3 is pulled out directly (referring to FIG. 7) from the wire-winding box. Then the communication wire 3 wound around the pivotal shaft 13 will be pulled more and more tightly so that the communication wire 3 wound around the pivotal shaft 13 will not disperse for avoiding the situation that part of the communication wire 3 cannot be rewound. Furthermore, the communication wire 3 wound around the pivotal shaft 13 (inner circle) can be tightly positioned on the pivotal shaft 13 without any positioning device.

Moreover, in the present invention, when the communication wire 3 is rewound into the box, only the second ring 22 winds the communication wire 3 and therefore, only the second ring 22 needs to use the spiral reed 4. Therefore, the spiral reed 4 needs only a small elastic force and thus the friction force to the communication wire 3 can be reduced effectively. The condition that the communication wire 3 is hindered by itself will not occur.

Figure 9:
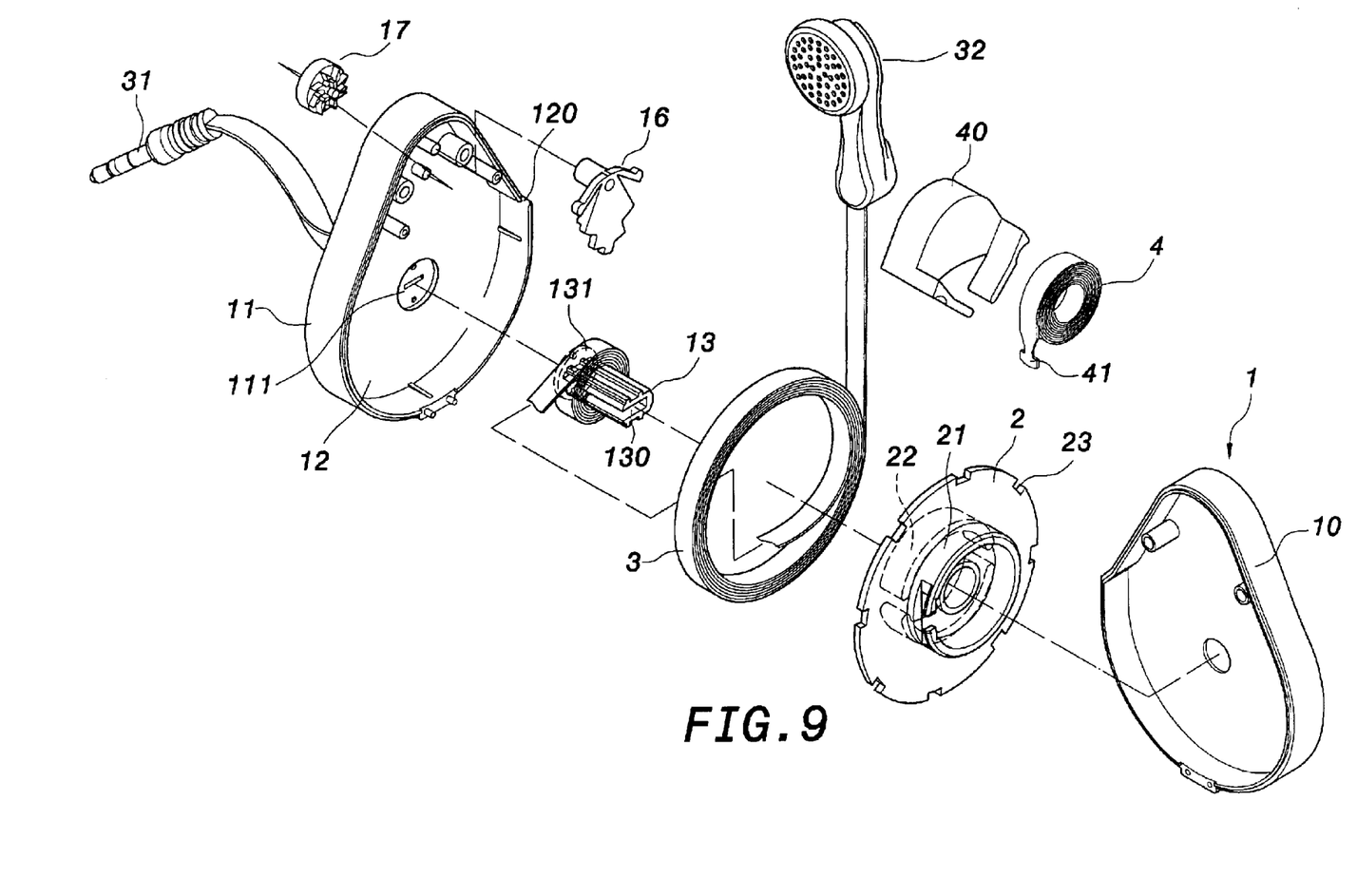
FIG. 9 is an exploded perspective view of a second embodiment of the present invention.

Furthermore, referring to FIG. 9, a second embodiment of the present invention is illustrated. In this embodiment, the pivotal-shaft 13 in the receiving groove 12 is separated. That is, the pivotal shaft 13 and the receiving groove 12 of the casing 1 are separate. One end of the pivotal shaft 13 is connected to a buckling body 131. A corresponding buckling groove 111 is installed in the receiving groove 12 of the casing 1. The buckling body 131 and the buckling groove 111 are engaged so that the pivotal shaft 13 can be assembled to the receiving groove 12 of the casing 1. Since the pivotal shaft 13 is separable, the communication wire 3 can be wound around the pivotal shaft 13 firstly at the outer side of the casing 1, and the pivotal shaft 13 is then assembled to the receiving groove 12 of the casing 1, thereby achieving easy and convenient winding operation.

Figure 10:
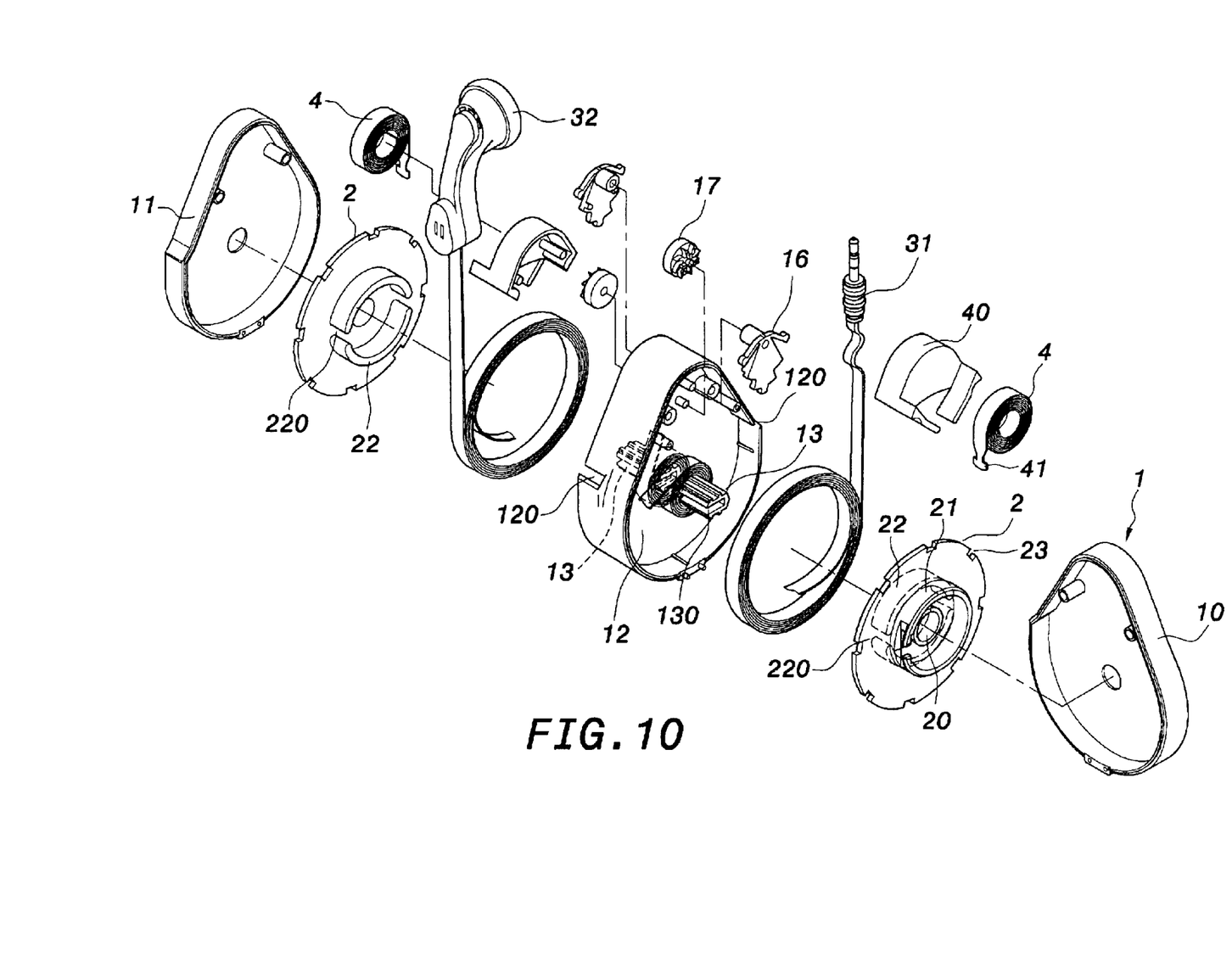
FIG. 10 is an exploded perspective view of a third embodiment of the present invention.

Moreover, with reference to FIG. 10, a third embodiment of the present invention is illustrated. In this embodiment, the casing 1 is formed by assembling a first casing half 10, a second casing half 11 and a middle seat 18 with two receiving grooves 12 formed therein. The two receiving grooves 12 are arranged at two surfaces of the middle seat 18. Each receiving groove 12 is installed with a pivotal shaft 13. Each pivotal shaft 13 is installed with a wire outlet 130. The two wire outlets 130 are communicated with one another. The lateral side of the casing 1 is installed with two wire outlets 120. Furthermore, two rotary disks 2 and two spiral reeds 4 are installed in the two receiving grooves 12, respectively. The communication wire 3 is installed in the two receiving grooves 12. The middle part of the communication wire 3 is installed at the two wire outlets 130 of the two pivotal shafts 13. Two wire ends of the communication wire 3 are wound around the two pivotal shafts 13 for several turns, pass through the slots 220 of the second rings 22 of the two rotary disks 2, are wound around the second rings 22 in the same direction, then protrude out from the two wire outlets 120 of the casing, respectively.

Figure 11:
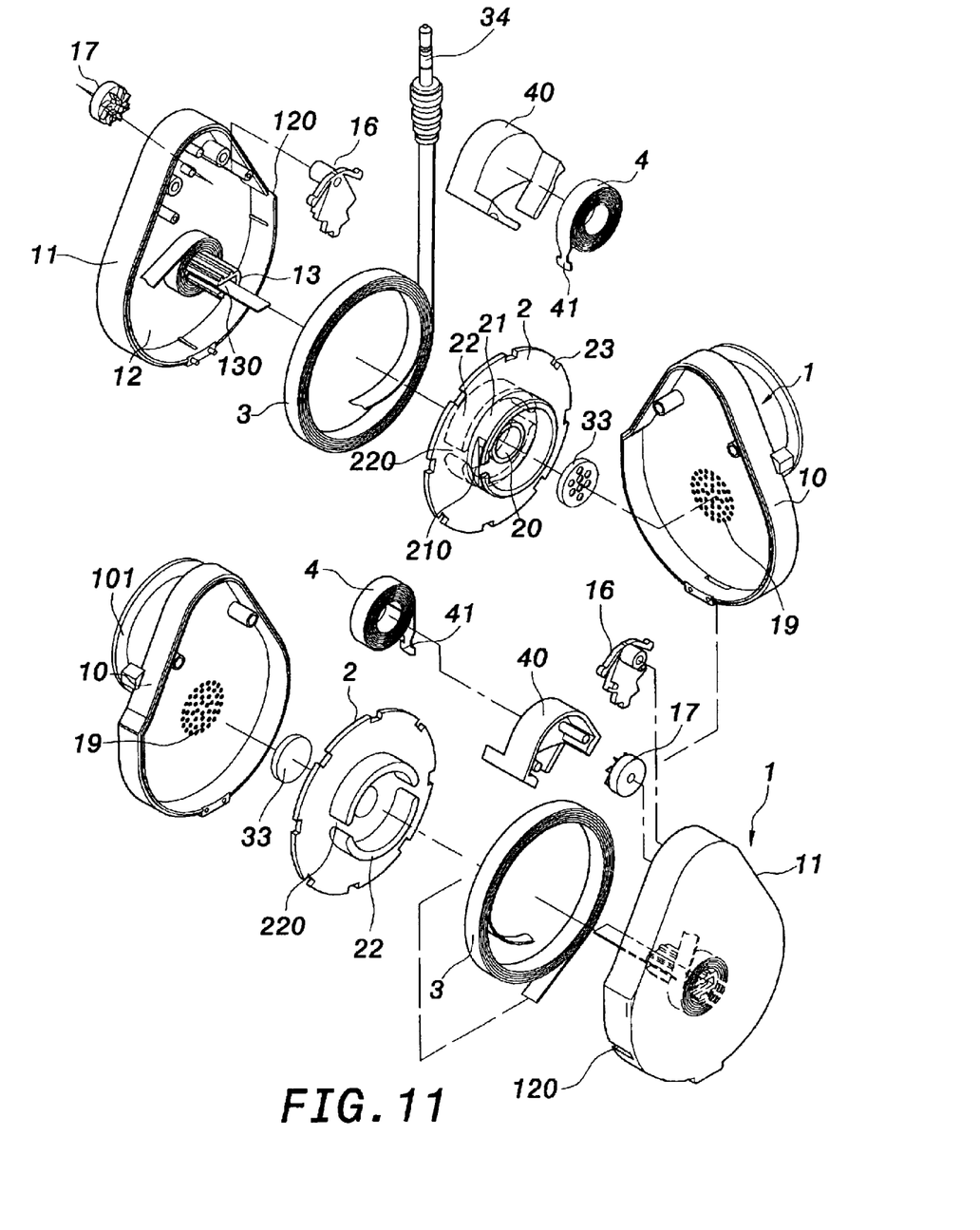
FIG. 11 is an exploded perspective view of a fourth embodiment of the present invention.
Figure 12:
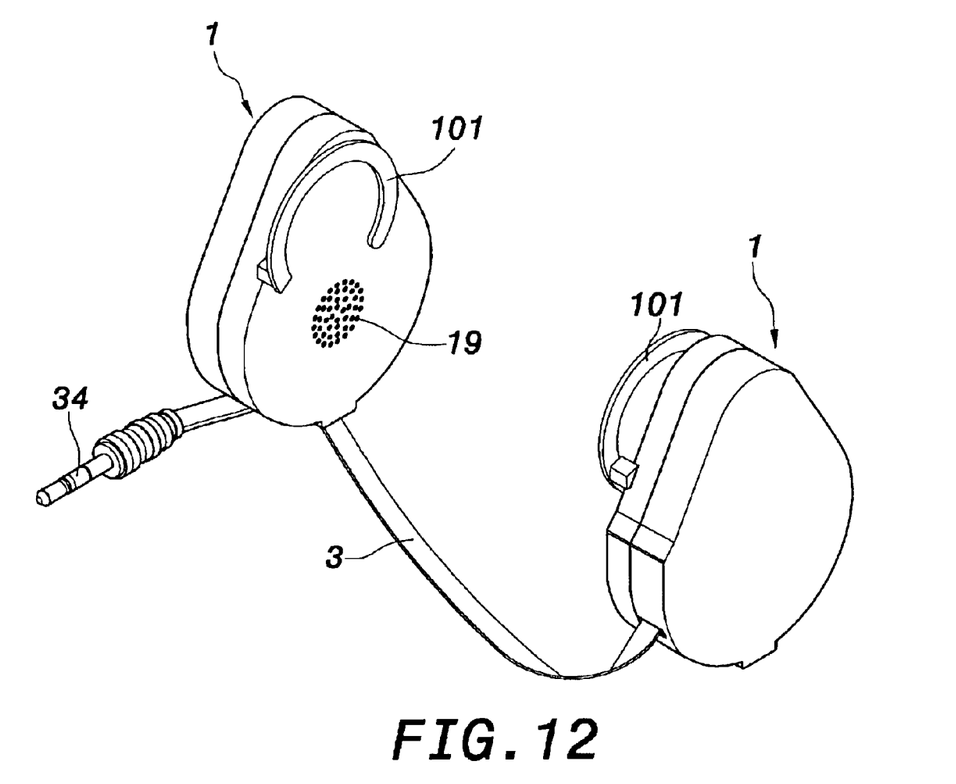
FIG. 12 is a perspective assembly view of the fourth embodiment of the present invention.
Figure 13:
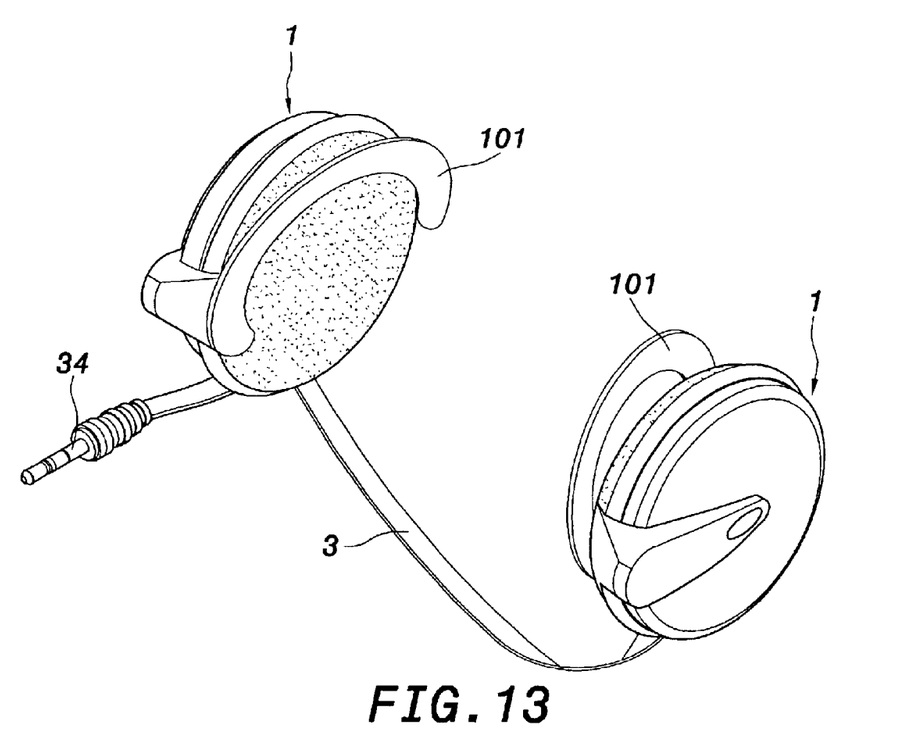
FIG. 13 is a perspective assembly view of a fifth embodiment of the present invention.

Additionally, referring to FIGS. 11 and 12, a fourth embodiment of the present invention is illustrated. In this embodiment, two wire-winding boxes are connected together. An earphone 33 is disposed in each of the two wire-winding boxes. A corresponding audio hole 19 is disposed on the casing 1 of each of the two wire-winding boxes. The two wire-winding boxes are connected together via a communication wire 3. One wire end of one communication wire 3 of one of the two wire-winding boxes is assembled to an audio source plug 34. An ear hanger 101 is disposed on the casing 1 of each of the two wire-winding boxes to be hung on the ear of a user. Moreover, the shape of the ear hanger 101 can be changed (referring to FIG. 13).

Figure 14:
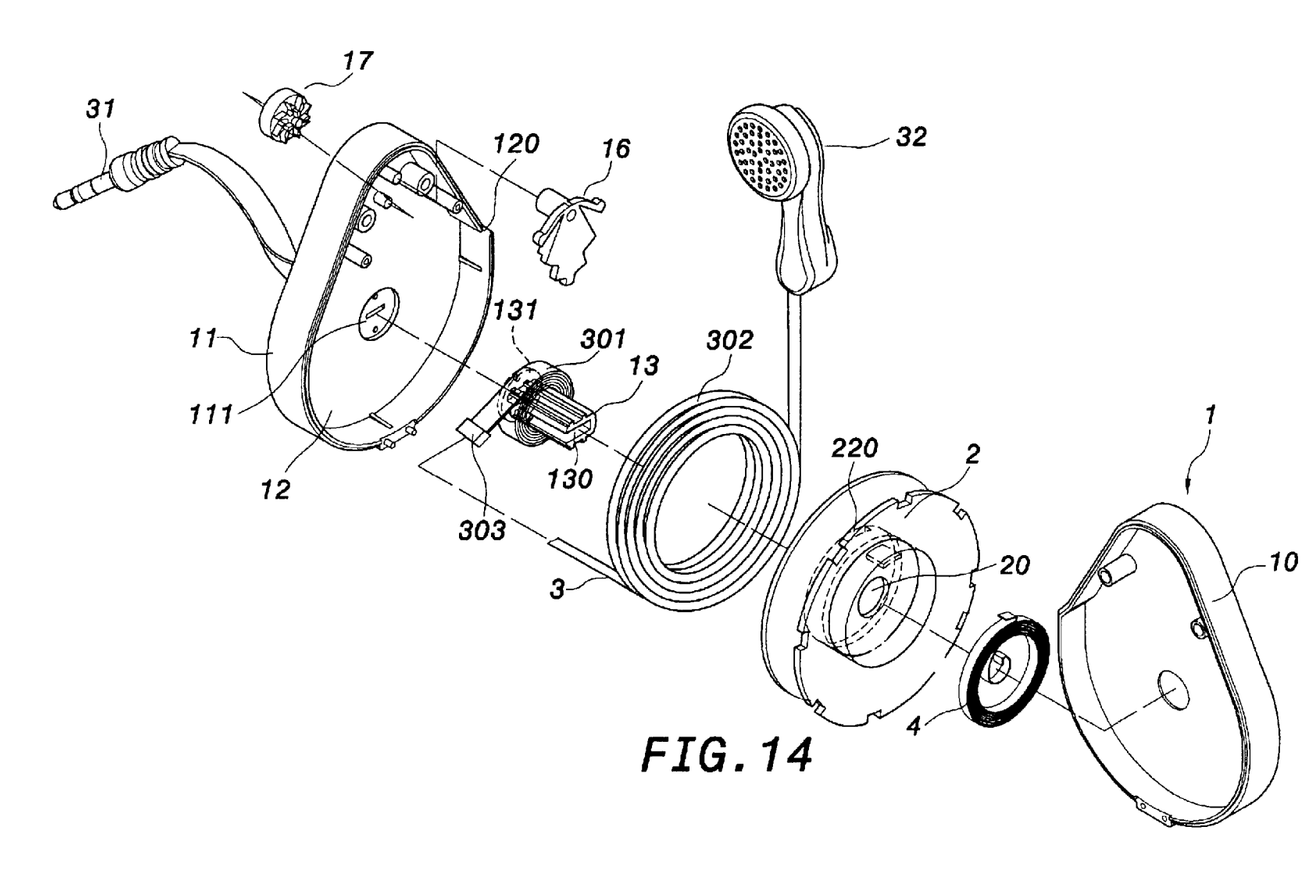
FIG. 14 is an exploded perspective view of a sixth embodiment of the present invention.
Figure 15:
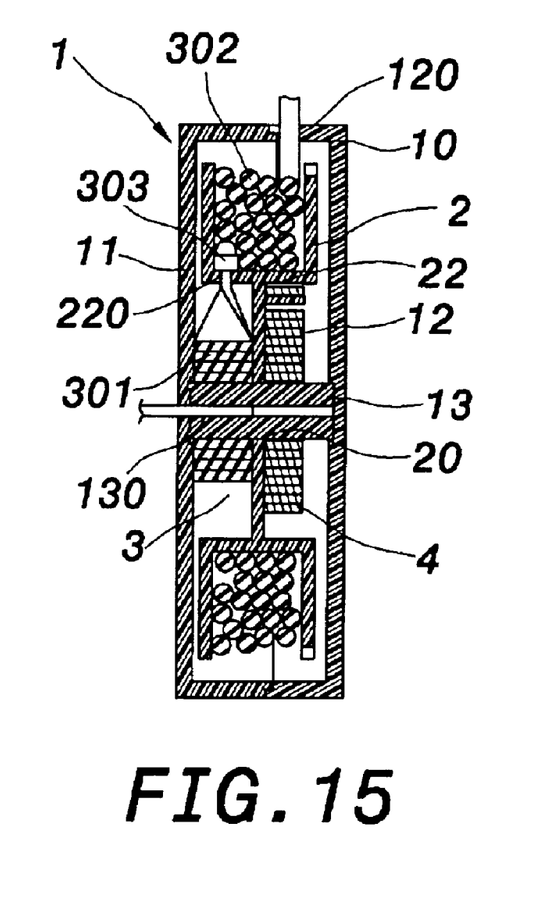
FIG. 15 is a cross-sectional view of the sixth embodiment of the present invention.

Besides, referring to FIGS. 14 and 15, a sixth embodiment of the present invention is illustrated. In this embodiment, the shape of the rotary disk 2 can be changed, and the communication wire 3 can be divided into a flat section 301 and a cylindrical section 302. The flat section 301 and the cylindrical section 302 are connected via a connector 303. One wire end of the flat section 301 passes through the wire outlet 130 of the pivotal shaft 13, and is then wound around the pivotal shaft 13. The cylindrical section 302 is wound around the second ring 22.

Figure 16:
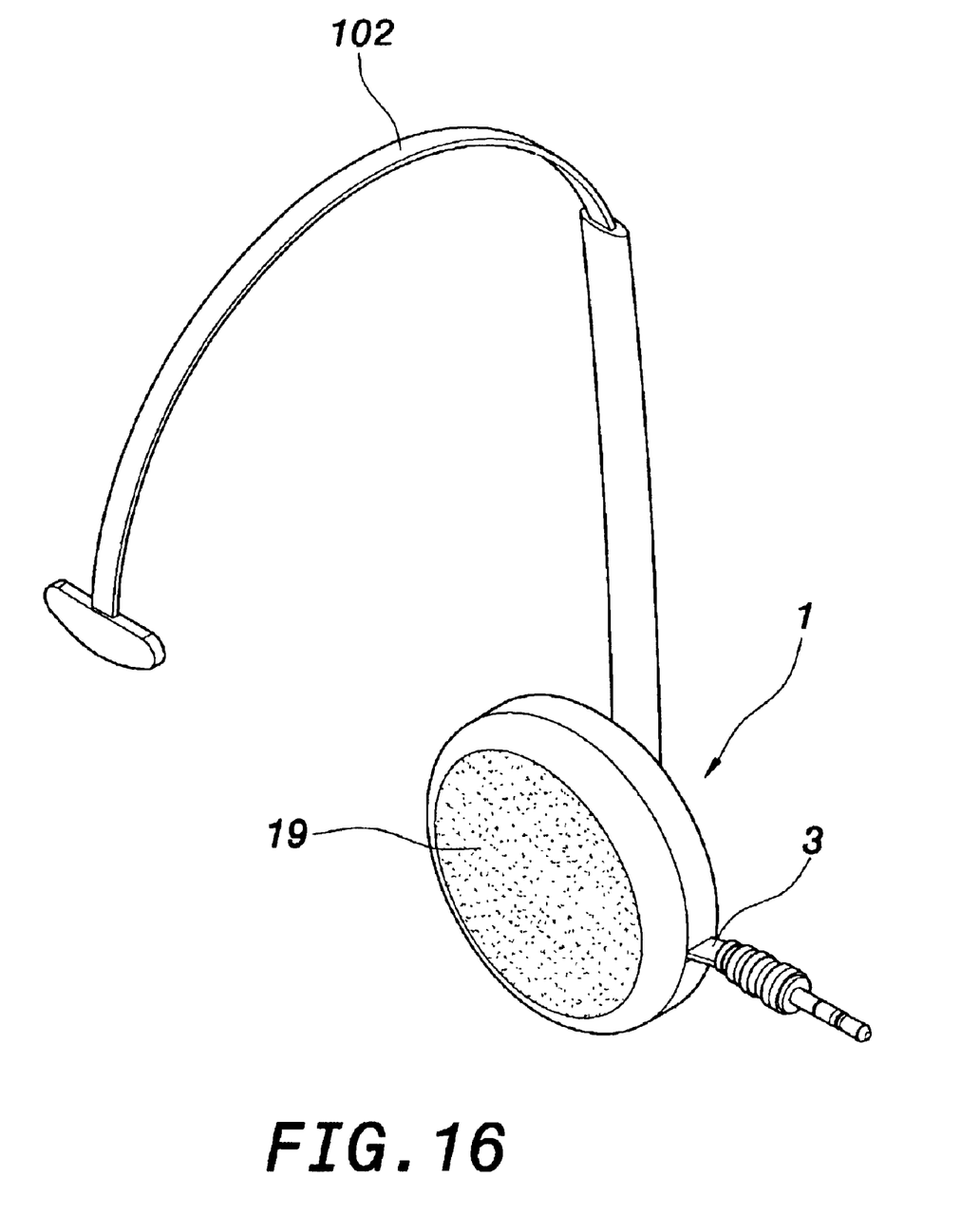
FIG. 16 is a perspective assembly view of a seventh embodiment of the present invention.
Figure 17:
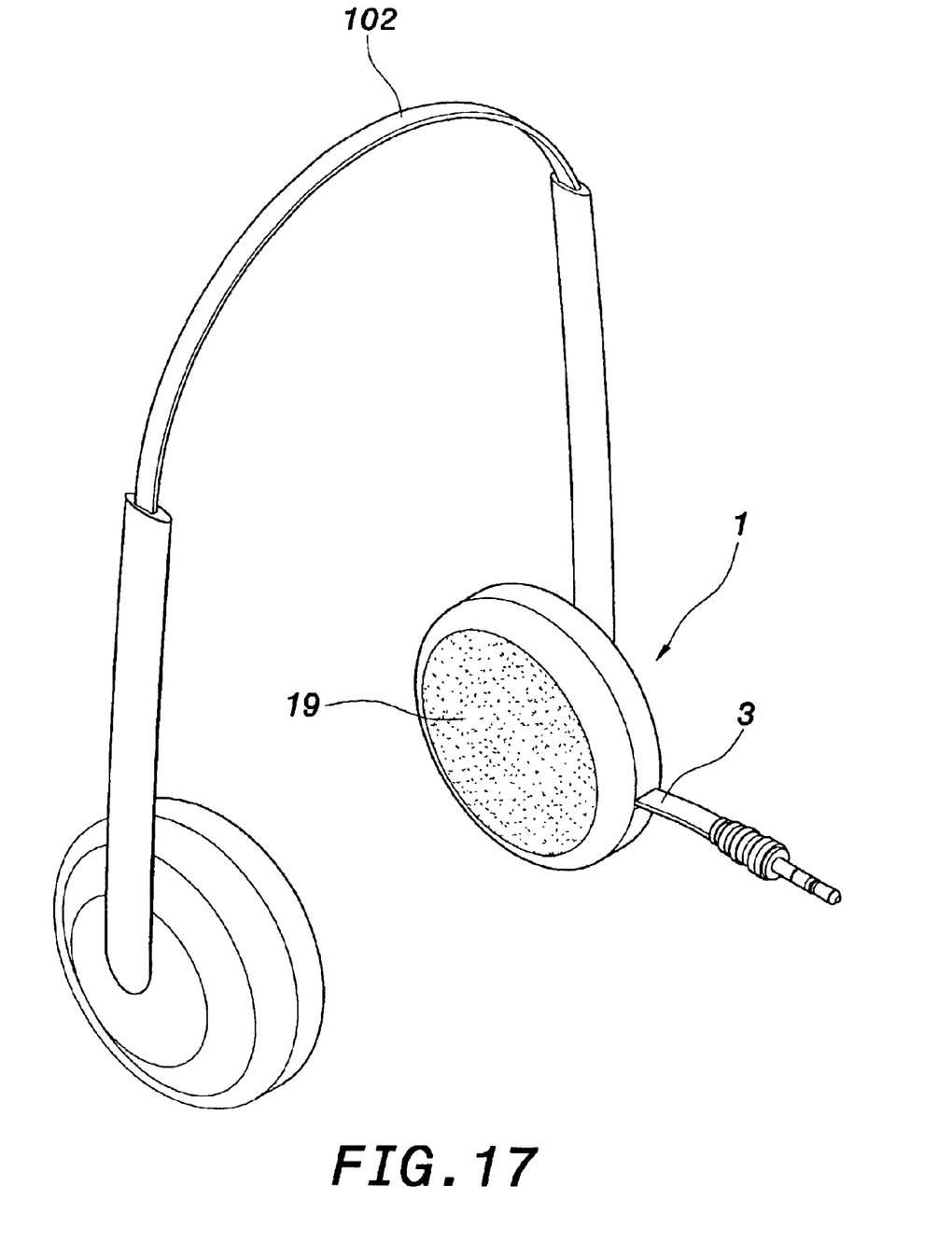
FIG. 17 is a perspective assembly view of an eighth embodiment of the present invention.

Additionally, FIGS. 16 and 17 show a seventh embodiment and an eighth embodiment of the present invention, respectively. In these two embodiments, an earphone (not shown) is disposed in the casing 1 of the wire-winding box, and the casing 1 has an audio hole 19 thereon corresponding to the earphone. One end of the communication wire 3 of the wire-winding box is assembled with an audio source plug 34. The casing 1 has also a hang tool 102 thereon to be hung at the head of a user and used for the earphone. Moreover, the shape of the hang tool 102 can be changed.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A short wire length wire-winding box comprising:
   a casing having a receiving groove therein, a pivotal shaft being disposed in said receiving groove, lateral sides of said pivotal shaft and said casing being installed with wire outlets;
   a rotary disk having a pivotal hole, the rotary disk rotatably engaged on said pivotal shaft in said receiving groove, one face of said rotary disk having a ring, said ring having a slot;
   a communication wire having on a first end passing through said wire outlet of said pivotal shaft to the outside of the casing and wound around directly on said pivotal shaft a plurality of turns, said communication wire having a second end passing through said slot of said ring and wound around said ring in the same direction as said communication wire is wound around on said pivotal shaft then protruding out from said wire outlet of said casing; and
   a spiral reed engaged between said casing and said rotary disk for providing restoring elasticity to rotate said rotary disk back to an initial position;
   wherein the communication wire is flat to facilitate winding, and
   wherein the pivotal shaft is fixed on the casing with the flat communication wire wound thereon.

2. The short wire length wire-winding box as claimed in claim 1, wherein the other face of said rotary disk is installed with a further ring; and said further ring is installed with a hook groove, said spiral reed being received in said receiving groove and one hook end of said spiral reed being hooked to said hook groove.

3. The short wire length wire-winding box as claimed in claim 1, wherein a plurality of buckling grooves are disposed at a periphery of said rotary disk, a swing piece capable of freely swinging and a ratchet capable of freely rotating are disposed adjacent to said rotary disk, and said communication wire is pulled or released repeatedly for fixing or rewinding through reaction between said swing piece, said ratchet, and said buckling grooves.

4. The short wire length wire-winding box as claimed in claim 1, wherein a communication wire is used to connect two wire-winding boxes, an earphone being disposed inside each of said two wire-winding boxes, an audio hole being disposed on said housing of each of said two wire-winding boxes, one wire end of said communication wire of one of said two wire-winding boxes being assembled to an audio source plug, an ear holder being disposed on said housing of each of said two wire-winding boxes.

5. The short wire length wire-winding box as claimed in claim 1, wherein said communication wire is divided into a flat section and a cylindrical section, said flat section and said cylindrical section being connected via a connector, said flat section being wound around said pivotal shaft, said cylindrical section being wound around said ring.

6. The short wire length wire-winding box as claimed in claim 1, wherein said housing is installed with a further receiving groove, said further receiving groove also having a pivotal shaft, said two pivotal shafts having wire outlets connected with each other, a further wire outlet being disposed at a lateral side of said housing, a further rotary disk being provided, said two rotary disks being received in said two receiving grooves and having pivotal holes to be inserted by said pivotal shafts for rotation, the other face of said rotary disk having a further ring, the middle part of said communication wire passing through said wire outlet of said pivotal shaft, two wire ends of said communication wire being wound around said two pivotal shafts for several turns, passing through said slots of said two rings, being wound around said two rings in the same direction, and protruding out of said two wire outlets of said housing, a further spiral reed being provided, said two spiral reeds being disposed between said housing and said two rotary disks.

7. The short wire length wire-winding box as claimed in claim 1, wherein an earphone is disposed in said casing, said casing has an audio hole thereon corresponding to said earphone, one end of said communication wire of said wire-winding box is assembled with an audio source plug, and said casing has also a hang tool to be hung at the head of a user.

* * * * *